United States Patent [19]
Takada

[11] 3,804,192
[45] Apr. 16, 1974

[54] SEAT BELT RESPONSIVE ENGINE ENABLING DEVICE

[75] Inventor: Takezo Takada, Hikone, Japan

[73] Assignee: Takata Kojyo Co., Ltd., Tokyo, Japan

[22] Filed: June 28, 1971

[21] Appl. No.: 157,562

[30] Foreign Application Priority Data
Oct. 14, 1970 Japan.............. 45-090684
Oct. 6, 1970 Japan.............. 45-087139
July 14, 1970 Japan.............. 45-069730
Aug. 27, 1970 Japan.............. 45-084724

[52] U.S. Cl.............. 180/82 C, 180/103, 180/101, 307/10 SB, 280/150 SB, 297/388, 340/52 D, 340/52 E

[51] Int. Cl............................................ B60r 21/10

[58] Field of Search.............. 180/82 C, 103, 101; 280/150 SB; 307/10 SB; 340/52 E; 297/385, 386, 387, 388

[56] References Cited
UNITED STATES PATENTS

| | | | |
|---|---|---|---|
| 3,343,622 | 9/1967 | Maurer............. | 180/82 C |
| 3,340,523 | 9/1967 | Whitman............ | 180/82 C |
| 2,708,966 | 5/1955 | Davis............... | 297/386 |
| 2,825,581 | 3/1958 | Knight............. | 280/150 SB |
| 3,308,902 | 3/1967 | Carter............. | 180/82 C |
| 3,240,510 | 3/1966 | Spouge............. | 180/82 C X |
| 2,883,123 | 4/1959 | Finnigan........... | 297/388 X |
| 3,437,993 | 4/1969 | Recio et al........ | 180/82 C X |
| 3,414,734 | 12/1968 | Konrad............. | 123/179 BI X |
| 3,368,540 | 2/1968 | Ault................ | 123/179 BG |
| 3,237,710 | 3/1966 | MacDonald......... | 180/82 C |
| 3,426,864 | 2/1969 | Halperin........... | 180/82 C |

FOREIGN PATENTS OR APPLICATIONS
1,166,825 10/1969 Great Britain........ 180/82 C Primary Examiner—David Schonberg
Assistant Examiner—John P. Silverstrim
Attorney, Agent, or Firm—Woler & Gross

[57] ABSTRACT

A motor vehicle safety belt system includes a switch actuated by the engagement of the driver's safety belt and a network for starting the vehicle engine upon the acutation of the switch. The passenger seats are provided with switches actuated by the occupation of the respective seats and switches actuated by the engagement of the respective safety belts, a signal being given if any seat is occupied and the respective seat belt disengaged. Each of the belts is provided with a spring wound take up reel which is pawl and sprocket braked against belt withdrawal, the brake being released upon occupation of a corresponding seat and engaged upon the actuation of a vehicle mounted inertia switch. The belts are of the waist and shoulder types, the shoulder belt having overlapping sections which are joined along longitudinally spaced transverse lines of stitching which are rupturable under progressively larger loads to extend the shoulder belts by successive increments under such loads.

12 Claims, 12 Drawing Figures

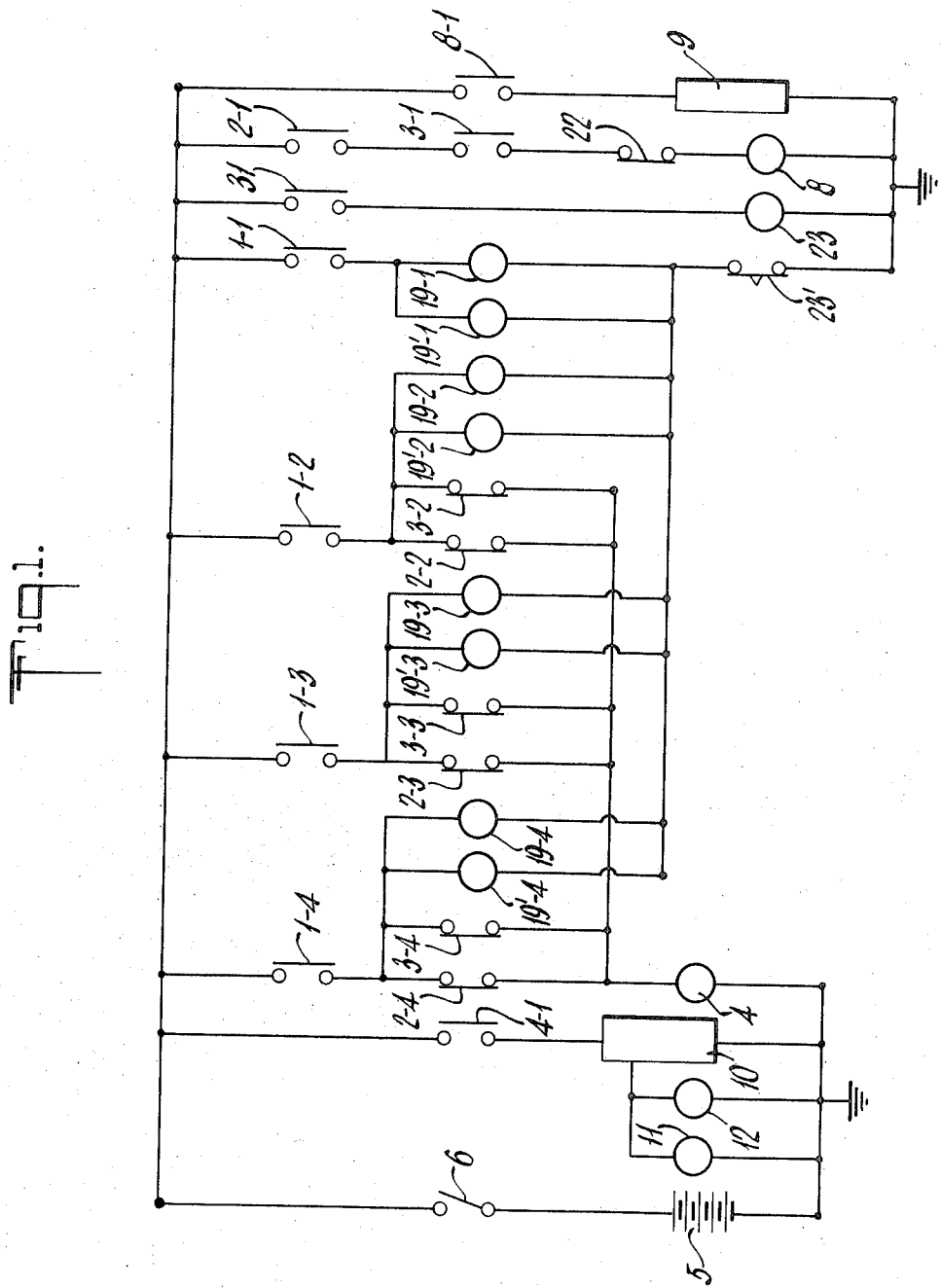

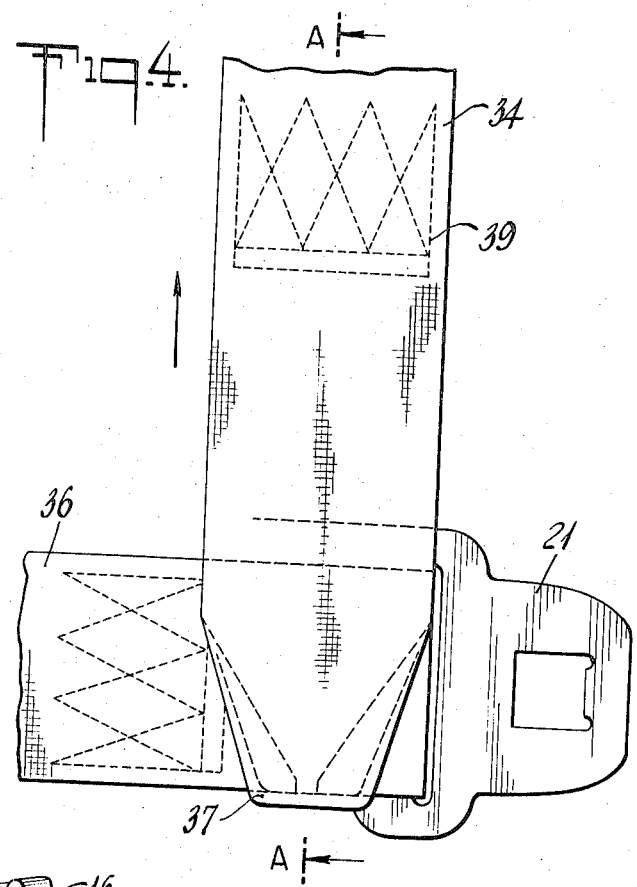
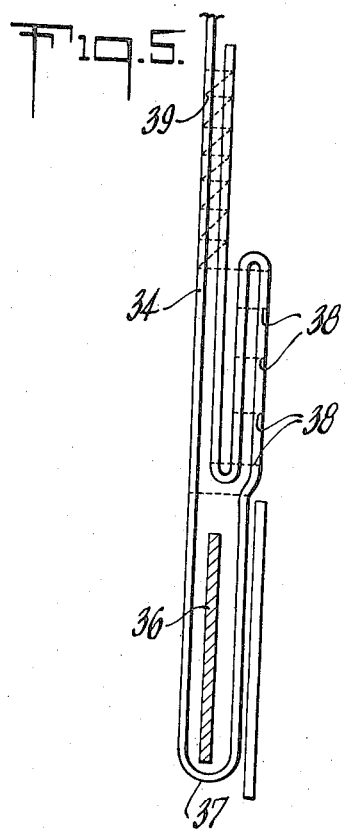
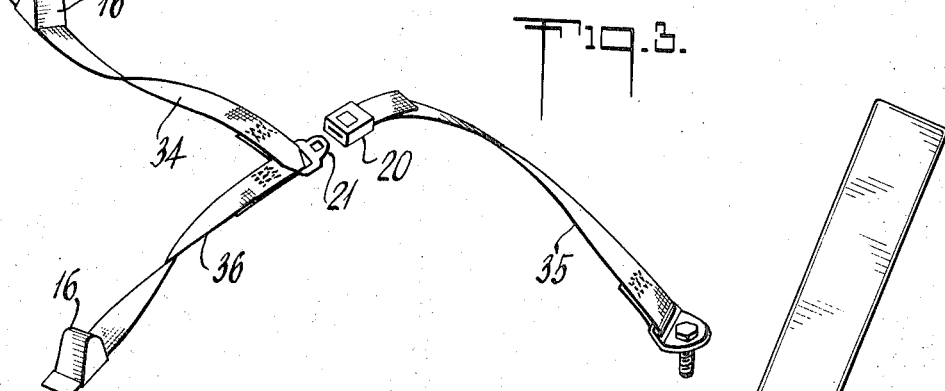
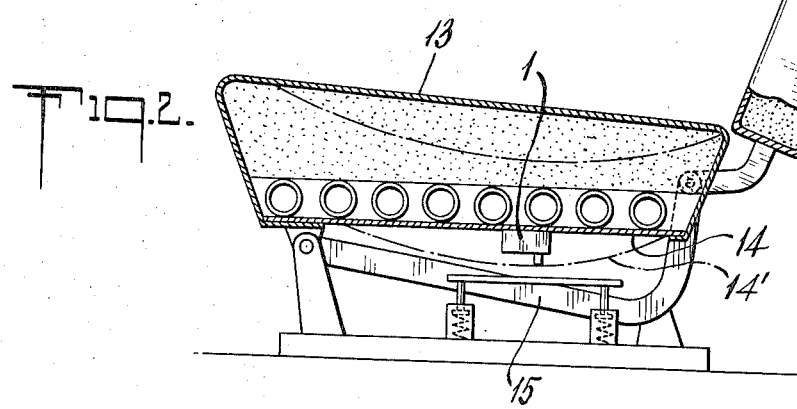

INVENTOR
TAKEZO TAKADA
ATTORNEY

INVENTOR
TAKEZO TAKADA
BY
ATTORNEY

SEAT BELT RESPONSIVE ENGINE ENABLING DEVICE

BACKGROUND OF THE INVENTION

The present invention relates generally to improvements in motor vehicle safety devices and it relates particularly to an improved motor vehicle safety belt system which assures the proper employment of the safety belt and permits freedom of movement, while restricting the movement of the occupants, in the event of collision or accident, in an optimum manner.

The conventional automobile is provided at each seat with a safety belt, generally of the three piece or combined waist and shoulder type, for example the type wherein only a single connection by a buckle or the like is required to attach or engage both the shoulder and waist straps or to disengage both straps. However, while the safety belt arrangements heretofore employed firmly restrain the occupant in the respective vehicle seat they possess numerous drawbacks and disadvantages. To begin with, it usually requires some effort and care for the driver or passenger to properly engage the corresponding safety belt and they frequently either inadvertently or knowingly neglect to engage their safety belts and are consequently exposed to severe injury even in minor accidents. Furthermore, the conventional shoulder safety belt not only greatly restrains and restricts some of the necessary movements of the occupants upper torso consequent upon the operation of the vehicle and for other purposes, but such trstriction is of such a nature as to result in serious injury or even death in the event of a collision by reason of the rigid restraint effected by the shoulder belt. It is thus clear that the safety seat belt systems generally employed leave much to be desired.

SUMMARY OF THE INVENTION

It is a prinicpal object of the present invention to provide an improved safety belt system for motor vehicles.

Another object of the present invention is to provide an improved motor vehicle safety belt arrangement which minimizes any likelihood of the inadvertent failure of the vehicle occupants to engage their seat belts.

Still another object of the present invention is to provide an improved motor vehicle safety belt system which assures the vehicle driver's proper engagement of his safety belt.

A further object of the present invention is to provide an improved motor vehicle safety belt system which provides an alarm or other signal in the event that the safety belts of the occupied seats are not properly engaged.

Still a further object of the present invention is to provide an improved motor vehicle safety belt shoulder strap, which minimizes injures due to an accident by reason of any excess restraint by the shoulder strap.

Another object of the present invention is to provide an improved motor vehicle shoulder safety belt which permits freedom of movement of the occupant but suitably restrains and restricts such movement in the event of an accident.

Still another object of the present invention is to provide a safety belt system of the above nature characterized by its reliability, convenience, comfort, versatility, and adaptability.

The above and other objects of the present invention will become apparent from a reading of the following description taken in conjunction with the accompanying drawings which illustrate a preferred embodiment thereof.

In a sense the present invention contemplates the provision in a motor vehicle of a safety belt associated with the driver's seat and a network responsive to the engagement of the safety belt for enabling the actuation of the vehicle engine, for example, by effecting the energization of the engine starting motor. Another feature of the invention is the network which furnishes an alarm or signal if any of the vehicle passenger seats is occupied and the associated safety belt is disengaged. Also contemplated by the present invention is the structure of the seat belt which includes a shoulder strap in which overlapping portions are provided which foreshorten the strap, the overlapping portions being interconnected by separable connections which, open upon being excessively loaded, permit the lengthening of the shoulder strap a given length attendant to a collision.

In the preferred form of the improved system each of the safety belts includes a spring wound belt retractor reel and a first switch which is actuated when the reel is in a belt withdrawn position and second switch which is actuated with the engagement of the belt buckle elements, the switches at the passenger seats being normally closed and at the driver's seat normally open. The first and second switches at the driver's seat are connected in series with the vehicle starter relay and a normally closed third switch to a source of current, the third switch being open by the running engine. A switch is associated with each passenger seat and is closed when the seat is loaded or occupied, the respective parallel connected first and second switches being connected in series with respective seat switches and an alarm actuating relay to a source of current. The belt reels are provided with a brake for restricting withdrawal of the belt, the brake being solenoid disengaged, and the solenoid being energized with the closing of the respective seat switch and being deenergized by the closing of an inertia switch attendant to a rapid change in the vehicle velocity or an excessive change in inclination.

The improved safety belt system provides maximum comfort, protection and maneuverability ot the vehicle driver and passengers and minimizes the likelihood of any failure on the part of the passengers and driver to properly engage and secure their safety belts.

BRIEF DESCRIPTION OF THE DRAWINGS

FIG. 1 is a circuit diagram of the electrical network of a safety belt system embodying the present invention;

FIG. 2 is a vertical sectional view of one of the vehicle seats showing the associated accupancy sensing switch;

FIG. 3 is a perspective view of a safety seat belt in accordance with the present invention;

FIG. 4 is an enlarged detailed fragmentary view of a portion of the safety belt;

FIG. 5 is a sectional view taken along line A — A in FIG. 4;

DESCRIPTION OF THE PREFERRED EMBODIMENT

Figure 6A:
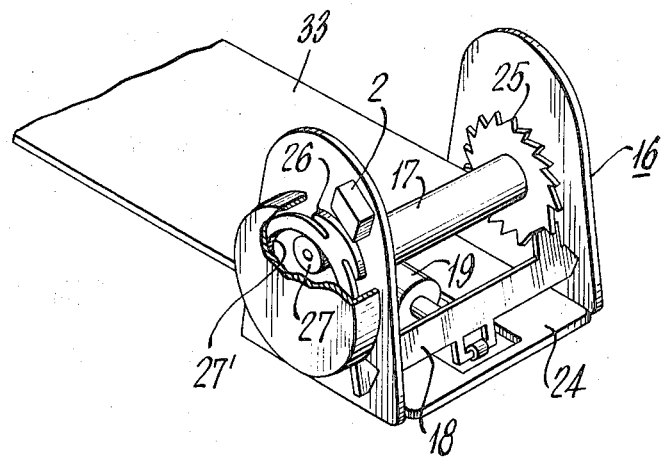
FIG. 6A is a fragmentary perspective view of a belt retracting reel in accordance with the present invention, shown with the housing thereof removed.

Referring now to the drawings which illustrate a preferred embodiment of the present invention as applied to a conventional motor vehicle or automobile having four seats, a driver's seat and three passenger seats, it should be understood that it is applicable to automobiles having any number of seats. As shown in FIG. 3 the reference numeral 33 generally designates a three-point combination waist and shoulder belt which is provided for each of the vehicle seats including the driver's seat and each of the three passenger seats. The safety belt 33 includes a shoulder belt 34, a waist belt section 35 extending from a fixed anchor point and a waist belt section 36 extending from a spring wound take up reel or retractor 16 on the opposite side. The waist belt sections 35 and 36 are releasably coupled by means of a connecting or buckle assembly including a buckle 20 and an attachment or tongue plate 21. The shoulder belt 34 is connected at one end to a suitable position on one of the waist belt sections to thereby define the three-point seat belt and is connected at its other end to another spring wound take up reel 16.

As best seen in FIGS. 4 and 5 that part 37 of shoulder belt 34 proximate the joined waist belt section 36 is looped or folded back about belt section 36 and is folded into overlapped sections, for example three such sections in an S-shaped relationship, it being understood any other number of overlapped sections may be provided to correspondingly shorten belt section 34. The outer pair of the belt overlapping sections are joined by one or more longitudinally spaced lines 38 of transversely spaced stitches or tacking threads which are rupturable or separable at a predetermined load or stress. The end portion of belt 34 beyond the overlapped sections is joined to an innersection of belt 34 by stitching 39.

The tacking thread of lines of stitches 38 may be any one of the natural fiber yarns such as cotton yarn, the artificial fiber yarns such as rayon, and the synthetic fiber yarns such as nylon. However, yarns such as those of cotton and rayon are preferred which may be cut or ruptured at a low load of, for example, 20 to 100 Kg. The tacking sewing may be applied or formed in any suitable number of, one or several, yarns and may be, for example, of linear sewing form. Furthermore, although the overlapping and tacking are located at the coupled portion in the illustrated embodiment, it may be located at a different position of the shoulder belt.

In addition, the manner of the fold-back is not restricted to the S-shape but may be in the form of the letter W or other shape whereby to temporarily provide releaseable surplus portion. This surplus portion is a section in which the tacking treads are cut, ruptured or otherwise separated due to being subjected to a shock to the automobile and into which the impact energy is absorbed. The length of the fold-back and strength of the tacking thread will determine the rate of absorption of the impact energy.

The state of the impact energy absorption due to the rupture of the tacking threads are such that even if at the shock the impact is simultaneously transmitted to the waist belts and to the shoulder belt, only the former belts are directly subjected to the impact to bring about vairations in tension. In contrast, the shoulder belt undergoes, owing to presence of the surplus portion is provided by the fold-back, delayed variations in tension by the amount corresponding to the tension upon the surplus portion, whereby it exhibits delayed variations in tension over the waist belts. This means, in effect, that the time at which the shock is received and accordingly the tension variation is caused, is retarded over that of the waist belts.

Referring now to FIGS. 2 and 6, each seat 13 in an automobile and a retractor 16 of the seat belt associated with the seat are resepctively provided with limit or sensing switches 1 and 2. The limit switch 1 is mounted, so as to face downwardly, on the lower surface of a cushion base portion 14 of the seat 13 and at a position over which the buttocks of a seat occupant are brought into contact. Switch 1 is adapted to sink along with the cushion base portion 14 when an occupant exceeding a predetermined weight, for example 25 Kg sits on the seat 13, whereby the actuating element of the limit switch 1 is brought into contact with a plate 15 disposed below the seat 13 so as to be pushed up by springs upwardly biasing plate 15, thus to change state and actuate the switches (1 - 1 to 1 - 4 in FIGS. 1 and 2). At the driver's seat and front-seat passenger's portions of the front seat 13 and at suitable positions of the rear seat 13, at least two such limit switches 1 are mounted. The internal contacts of the switches 1 are indicated at 1 - 1 at driver's seat 13 and 1- 2, 1-3 and 1-4 passenger seat 13 in FIGS. 1 and 2. The limit switches 1 are disposed at positions at which it is detectible that riders are seated on the respective seats within the seating capacity of the automobile.

Figure 6B:
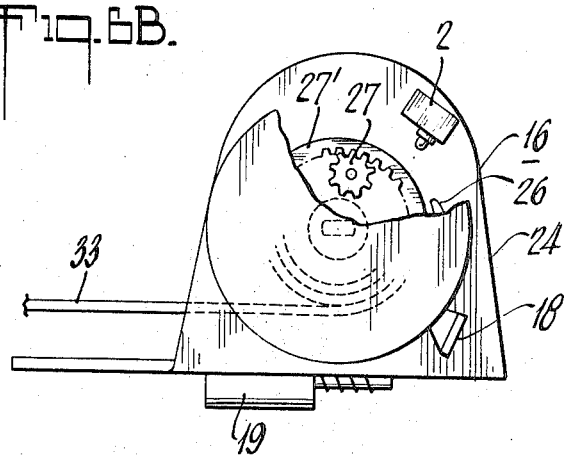
FIG. 6B and 6C are side elevational views thereof in belt withdrawn and belt retracted positions respectively.
Figure 6C:
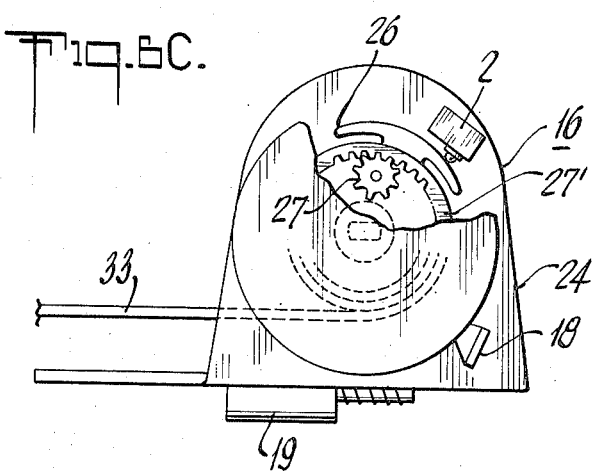

The limit switch 2 is secured onto an end plate of the retractor 16. Internal contacts ( 2- 1 to 2 - 4 in FIG. 1) of the limit switch 2 are adapted to be changed over by means of an actuator 26 driven through gears 27 and 27' by the shaft of a drum or reel 17, at a position (shown in FIG. 6b) at which a belt wound on the take-up drum 17 is taken out by a predetermined amount when the belt is attached, i.e., when the coupling member of buckle is connected, and at another position (shown in FIG. 6c) at which the belt is retracted or rewound. The retractor 16 shown in FIG. 6 is of the emergency lock type, in which the drum shaft is journalled in and projects beyond both side plates of a U-shaped frame 24 and on which the belt take-up drum 17 is affixed in a number to cover the shaft.

On the inner surface of one side plate of the frame 24, a ratchet 25 is secured to the drum shaft and the belt take-up drum 17. A pawl 18 engageable with the ratchet 25 is swingably mounted below the take-up drum 17 and substantially in parallel with the shaft, through apertures provided in both the side plates of the frame 24. Eccentrically coupled to the central part of the pawl 18 is a rod or armature of an electromagnet or solenoid 19. Operatively the electromagnet 19 is energized to disengage the pawl 18 from the ratchet 25, while in an emergency it is deenergized to bring the pawl 18 into engagement with the ratchet 25, as will be hereinafter described.

Figure 8A:
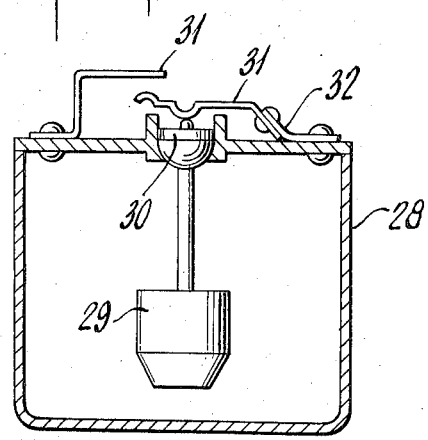
FIGS. 8A and 8B are vertical sectional views of an inertia operated switch employed in the improved system illustrated in its normal and actuated positions respectively.
Figure 8B:
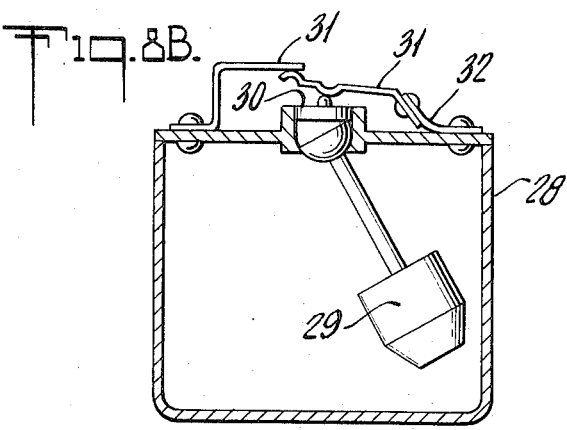

Details of an inertia switch mechanism 28 for actuating the electromagnet 19 upon the tilt or high acceleration or deacceleration of the car body are as illustrated in FIG. 8. A pendulum 29 is swingably contained in the interior of a housing, and the motion thereof from the vertical raises a slide element 30 engaging the cammed head portion of the pendulum and thus brings contact pieces 31 and 31 above slide element 30 into mutual contact. The inertia switch mechanism 28 is not restricted to that illustrated, but may be of any suitable type. A spring 32 resiliently urges contacts 31 to their open position. The retractors 16 are provided at one end of each of the shoulder and waist belts at the driver's and at each of the passenger seats such as the front-seat passenger's seat, and right and left rear seats. The respective electromagnets 19 of the retractors 16 are represented in FIG. 1 by reference characters 19 - 1 to 19 - 4 and 19'-1 to 19' -4.

Figure 7A:
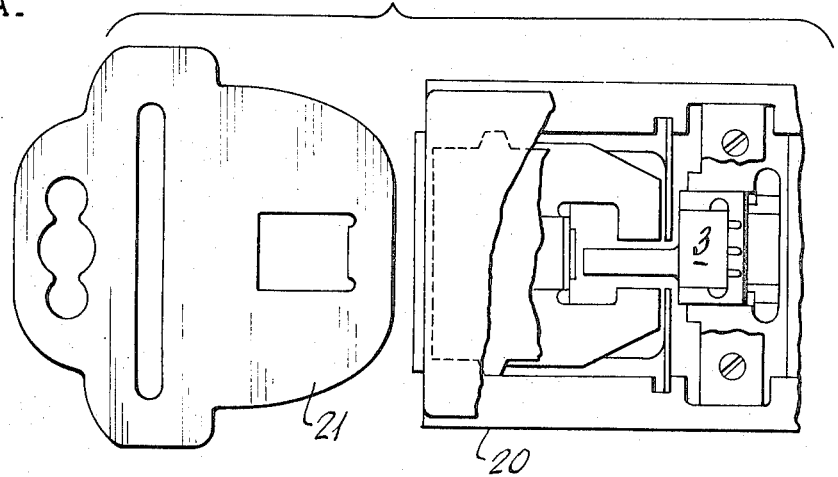
FIGS. 7A and 7B are fragmentary plan views of the belt buckle and sensing assembly illustrated in separated and engaged positions respectively.
Figure 7B:
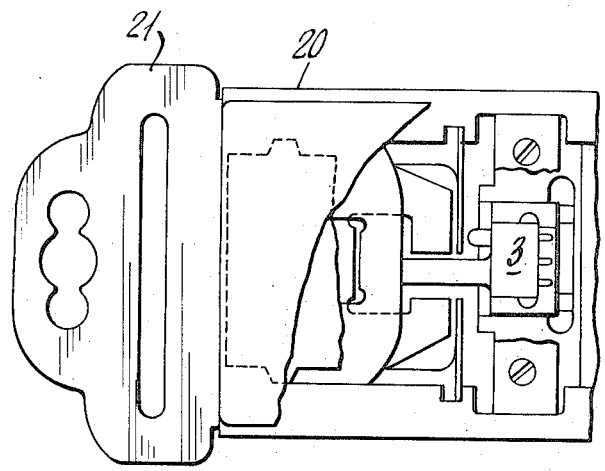

The buckle 20 of each seat belt 33 is provided with and houses, as show in FIG. 7, a respective switch 3 - 1 to 3 - 4 in such a way that the switch is actuated when the buckle is brought into engagement with the attachment piece 21. These limit switches 3 - 1 to 3 - 4, the limit switches 1 - 1 to 1 - 4 for the seats, and the limit switches 2 - 1 to 2 - 4 for the retractors 16 are arranged into an electrical control circuit shown, by way of example only, in FIG. 1.

Referring now to FIG. 1, that portion of the system according to the present invention, which relates to the activation of the vehicle engine will be first explained. The respective normally open contacts 2 - 1 and 3 - 1 actuated by the retractor 16 and the buckle 20 and tongue 21 of the seat belt 33 at the driver's seat, a coil of an engine starting relay 8, and the normally closed contacts 22 of a relay switch which is actuated to an open position in response to the normal rotation of the engine, are connected in series, through a power switch 6 across a power source 5. The engine starting relay 8 is adapted to, upon being energized, close a normally open contact 8 - 1 thereby coupling an engine starter 9 to the power source.

The normally open contacts 31 of the car body responsive inertia switch mechanism 28 is connected in series with a coil of a delay relay 23 across the power source 5. An instantaneously operative, time-limit reset type normally closed contact 23' of the delay relay 23 is adapted to be adjusted to a suitable reset time-limit, and is usually set in a range of 3 to 10 seconds. The normally open contact 1 - 2 of the limit switch 1 located at the front passenger seat, and the normally closed contact 2 - 2 of the limit switch 2 of the seat belt at the front passenger seat which is connected in parallel with the normally closed contact 3 - 2 of the seat belt at the front passenger seat, and a relay solenoid 4 are connected in series across the power source 5. connected in parallel across the above series circuit consisting of the contacts 1 - 2 and 2 - 2, are a series circuit consisting of the normally open contact 1 - 3 of the limit switch 1 for the right half of the rear seat and the normally closed contact 2 - 3 of the limit switch 2 for the seat belt of said seat half, said contact 2 - 3 being arranged in parallel with the normally closed contact 3 - 3 at the coupling member for the seat belt of said seat half, and a further series circuit consisting of the normally open contact 1 - 4 of the limit switch 1 for the left half of the rear seat and the normally closed contact 2 - 4 of the limit switch 2 for the seat belt of said seat half, said contact 2 - 4 being arranged in parallel with the normally closed contact 3- 4 at the coupling member for the seat belt of said seat half. The normally open contact 4 - 1 of the relay 4 is connected in series with a flasher device 10 in order to connect or disconnect the device 10 across the power source 5, while a flasher contact (not shown) of the flasher device 10 is incorporated in series with a buzzer 11 and an alarm lamp 12 so that they may be flashed.

Thus the normally open contact 1 - 1 of the limit switch 1 disposed at the driver's seat is connected in series with the electromagnet 19 - 1 of the retractor 16 for the shoulder belt and the electrogmagnet 19' - 1 of the retractor 16 for the waist belt, at the driver's seat and which electromagnets are connected in parallel with each other. This series circuit is coupled across the power source 5 serially through the normally closed contact 23' of the delay relay 23. Connected in parallel with the series circuit consisting of the contacts 1 - 1 and the parallel connected electromagnets 19 - 1 and 19' - 1, are a series circuit consisting of the normally open contacts 1 - 2 of the limit switch 1 of the front passenger seat and the retractor electromagnet 19' - 2 of the waist belt, this electromagnet being connected in parallel with the retractor electromagnet 19 - 2 for the shoulder belt of the front passenger seat belt 33, another series circuit consisting of the normally open contacts 1 - 3 of limit switch 1 of the right rear passenger seat and the retractor electromagnet 19' - 3 for the waist belt, this electromagnet being connected in parallel with the retractor electromagnet 19 - 3 for the shoulder belt of the right rear passenger seat belt 33, and a still further series circuit consisting of the normally open contacts 1 - 4 of the limit switch 1 of the left rear passenger seat and the retractor electromagnet 19' - 4 for the waist belt, this electromagnet being connected in parallel with the retractor electromagnet 19 - 4 for the shoulder belt of the left rear passenger seat belt 33.

With reference to the electrical circuit constructed as described above, in the operation of the protective system according to the present invention, when the driver of the automobile and the passengers occupy the seats 13, the normally open contacts 1 - 1 to 1 - 4 of each limit switch 1 will be respectively closed. Then, the respective electromagnets 19 - 1 to 19 - 4 of the retractors 16 disposed at the shoulder and waist belts of the seat belts 33 are energized, so that the belts are unlocked. The respective belts are now subject only to retraction due to a rolling-in reaction force of the retractor springs, and may be easily manually withdrawn.

In this case, if at least one passenger, for example, the one occupying the front passenger seat, does not sufficiently withdraw the shoulder and waist belts or does not bring the belt coupling member into engagement, the normally closed contacts 2 - 2 and 3 - 2 of the seat of the particular passenger remains closed. Then, along with the closure of the normally open contact 1 - 2, the relay 4 is energized. Accordingly, the contact 4 - 1 thereof is closed to connect the flasher device 10 to the power source. The buzzer 11 and the alarm lamp 12 thereby signal the non-fastening of the seat belt. When all the riders have attached their seats belts, the buzzer 11 and the alarm lamp 12 are rendered inoperative. It is of course a consequence that if, irrespective of whether the automobile is at rest or travelling, any passenger fails to fasten or uncouples the seat belt, then the buzzer 11 and the alarm lamp 12 will become operative.

On the other hand, should the driver not withdraw the shoulder and waist belts by a predetermined length and couple them over his body in the normal way, the normally open contact 2 - 1 and/or 3 - 1 remain opened. The engine starting relay 8 is thus not energized, so that the motor car may not start. It should be noted that although not shown in the drawings, normally closed contacts may be easily added to the retractor as well as to the coupling member of the seat belt at the driver's seat so as to provide an alarm in the event of detachment of the driver's safety belt, as is the case in the passenger seats, and such arrangement is desirable. Upon the driver effecting the proper attachment of the seat belt, both the normally open contacts 2 - 1 and 3 - 1 are closed to initiate the starting of the engine. When the engine starting is completed and hence the engine reaches normal speed, then the normally closed contact 22 will be opened. As a result, the engine starting relay 8 is deenergized. The engine starter 9 is not driven any longer than a required time-limit. After the driver and passengers have securely attached the seat belts, the alarm devices stop, the engine is driven in the normal manner, and the automobile may be operated as usual.

If during travel of the motor car, an abrupt positive or negative acceleration occurs due to, for example, a collision or accident, then the contacts 31 of the car-body responsive inertia switch mechanism 28 will be closed to energize the delay relay 23 and thereby instantaneously open the contact 23'. Consequently, the electromagnets 19 - 1 to 19 - 4 and 19' - 1 to 19' - 4 of the seat belt retractors are deenergized to cause the pawl 18 to mesh with the ratchets 25 and brake or lock the take-up drums 17 to prevent withdrawal of the belts. The riders are accordingly prevented from falling forward, by means of the seat belts. In this case, the structure of the improved three-point seat belt, as described above, delays the variation in tension of the shoulder belt over that of the waist belt and to greatly reduce the load applied at one time. Therefore, the load and acceleration to be applied to the head and breast of each rider is reduced, and the full tension effect is eliminated, whereby a high degree of safety is positively achieved. Even if the contacts 31 of the car-body responsive inertia switch mechanism 28 as in FIG. 1 are momentarily or fleetingly opened, the contacts 23' has a time limit set in advance and is adapted to time-reset. Therefore, the possibility of sudden release of the seat belt from restraint at the time of shock is prevented.

While there has been described and illustrated a preferred embodiment of the present invention, it is apparent that numerous alterations, omissions and additions may be made without departing from the spirit thereof.

What is claimed is:

1. A motor vehicle including a drive engine comprising means for starting said drive engine, a first seat in said vehicle, a safety belt associated with said seat and movable between an engaged and a disengaged condition, a spring retracted take-up reel upon which said safety belt is wound and urged toward a retracted position, a first switch transferable between an actuated and a deactuated position in response to the engaged and disengaged conditions respectively of said belt, a second switch transferable between an actuated and deactuated position in response to said belt being withdrawn from said reel more and less respectively than a predetermined amount, a third switch transferable between an actuated and a reactivated position in response to the rotation of said engine being below and exceeding a predetermined value respectively and means responsive to all of said switches being simultaneously in their actuated positions for enabling said engine starting means and responsive to at least one of said switches being in its deactuated position for disabling said engine starting means.

2. The motor vehicle of claim 1 wherein said engine starting means comprises an engine starter relay and circuit means for connecting said relay to a source of current and being in an open condition when at least one of said switches is deactuated.

3. The motor vehicle of claim 1 wherein each of said first and second switches is closed and opened when in its actuated and deactuated positions respectively and said third switch is opened and closed when in its actuated and deactuated positions respectively and said engine starting means comprises an engine starter relay and means for connecting said relay and switches in series to a source of current.

4. The motor vehicle of claim 1 wherein said safety belt includes a pair of separably engageable buckle elements, said first switch being transfered to an actuated position upon engagement of said buckle elements.

5. The motor vehicle of claim 1 wherein said safety belt terminates in a tongue member and including a buckle member engageable with said tongue member in a releasably locked position, said first switch being mounted on said buckle and actuated in response to the buckle engaged condition of said tongue member.

6. The motor vehicle of claim 1 including a second seat, a second safety belt associated with said second seat and movable between engaged and disengaged positions, and means for providing a signal in response to the concurrent occupation of said second seat and the disengaged position of said second safety belt.

7. The motor vehicle of claim 1 comprising means for providing a signal in response to the concurrent occupation of said seat and the disengaged position of said safety belt.

8. The motor vehicle of claim 7 wherein said signal means comprises a first switch transferable to first and second states in response to the downward force on said seat being respectively more or less than a predetermined value, a second switch transferable to first and second states in response to the disengage and engage positions respectively of said safety belt, said signal means being actuated when said first and second switches are both in their first state.

9. The motor vehicle of claim 7 comprising a spring retracted take-up reel upon which said belt is wound, and a switch positioned proximate to said reel and actuated in response to the rotation of said reel to a position corresponding to the withdrawal of said safety belt to its normally engage position, said signal means being responsive to the actuation of said switch.

10. The motor vehicle of claim 7 comprising a spring retracted take-up reel upon which said belt is wound, reel braking means normally restricting the withdrawal of said safety belt, and means responsive to the occupation of said seat for releasing said braking means.

11. The motor vehicle of claim 10 comprising a inertia switch, and means responsive to the actuation of said inertia switch for engaging said brake independently of the occupation of said seat.

12. The motor vehicle of claim 1 wherein said second switch is mounted on said reel.

* * * * *